US007526384B2

(12) United States Patent
MacIntosh et al.

(10) Patent No.: US 7,526,384 B2
(45) Date of Patent: Apr. 28, 2009

(54) METHOD FOR CORRECTING A 3D LOCATION MEASURED BY A TRACKING SYSTEM ASSUMING A VERTICAL OFFSET

(75) Inventors: Scott MacIntosh, Walpole, MA (US); Ralf A. Birken, Somerville, MA (US); Qifu Zhu, Medford, MA (US)

(73) Assignee: Witten Technologies Inc., Jacksonville, FL (US)

( * ) Notice: Subject to any disclaimer, the term of this patent is extended or adjusted under 35 U.S.C. 154(b) by 0 days.

(21) Appl. No.: 11/371,222

(22) Filed: Mar. 9, 2006

(65) Prior Publication Data

US 2006/0271298 A1 Nov. 30, 2006

Related U.S. Application Data

(60) Provisional application No. 60/659,903, filed on Mar. 10, 2005.

(51) Int. Cl.
*G01V 3/38* (2006.01)
*G01C 1/00* (2006.01)

(52) U.S. Cl. .......................................... 702/5; 356/147
(58) Field of Classification Search ...................... 702/5, 702/2, 150–154; 701/205, 207–208, 213–215, 701/220, 223; 342/357.01–357.03, 357.06, 342/357.08; 356/139.01, 138, 139.04, 140, 356/147; 324/326
See application file for complete search history.

(56) References Cited

U.S. PATENT DOCUMENTS

| | | | | | |
|---|---|---|---|---|---|
| 4,113,381 | A | * | 9/1978 | Epstein | 356/5.12 |
| 4,600,997 | A | * | 7/1986 | Cain et al. | 702/5 |
| 5,055,666 | A | * | 10/1991 | Miyahara | 250/206.1 |
| 5,141,307 | A | * | 8/1992 | Bennett | 356/3.01 |
| 5,185,610 | A | * | 2/1993 | Ward et al. | 342/357.11 |
| 5,237,384 | A | * | 8/1993 | Fukunaga et al. | 356/139.06 |
| 5,321,893 | A | * | 6/1994 | Engebretson | 33/304 |
| 5,467,290 | A | * | 11/1995 | Darland et al. | 342/463 |
| 5,471,218 | A | * | 11/1995 | Talbot et al. | 342/357.03 |

(Continued)

OTHER PUBLICATIONS

Lloret, Polen, Inertial + Total Station + GPS for High Productivity Surveying, 1990 IEEE, pp. 338-346.*

(Continued)

*Primary Examiner*—Edward R Cosimano
*Assistant Examiner*—Toan M Le
(74) *Attorney, Agent, or Firm*—Mark Young, P.A.

(57) ABSTRACT

Position measurements by a tracking system associated with a survey tool are corrected for tilt. The tracking station typically incorporates some offset from the surface across which a survey is conducted, and the offset will be subject to angular displacement as the tool tilts with respect to its normal orientation. The tracking system records the 3D position of the survey tool, with angular offset errors. In the disclosed examples, an inertial measurement unit (IMU), a dual axis inclinometer or a combination of two single axis inclinometers measures the amount of angular offset. The angular offset data is used to correct the position data, e.g. to reduce or eliminate errors caused by the angular offset, e.g. from vertical. If the tool provides measurement data, e.g. GPR readings, processing of the measurement data from the survey tool uses the corrected position data, e.g. to produce images of sub-surface features or objects.

23 Claims, 14 Drawing Sheets

U.S. PATENT DOCUMENTS

| | | | | |
|---|---|---|---|---|
| 5,631,732 | A * | 5/1997 | Schrum, Jr. | 356/147 |
| 5,680,048 | A * | 10/1997 | Wollny | 324/329 |
| 5,760,909 | A * | 6/1998 | Nichols | 356/4.08 |
| 5,831,573 | A * | 11/1998 | Muir | 701/214 |
| 5,870,689 | A * | 2/1999 | Hale et al. | 702/5 |
| 5,903,235 | A * | 5/1999 | Nichols | 342/357.17 |
| 6,014,109 | A * | 1/2000 | Raby | 343/765 |
| 6,052,083 | A * | 4/2000 | Wilson | 342/357.17 |
| 6,078,285 | A * | 6/2000 | Ito | 342/357.17 |
| 6,138,367 | A * | 10/2000 | Raby | 33/290 |
| 6,144,308 | A * | 11/2000 | Dunne | 340/689 |
| 6,175,328 | B1 * | 1/2001 | Ericsson et al. | 342/357.08 |
| 6,248,989 | B1 * | 6/2001 | Ohishi | 250/205 |
| 6,425,186 | B1 * | 7/2002 | Oliver | 33/293 |
| 6,618,133 | B2 * | 9/2003 | Hedges et al. | 356/4.08 |
| 6,628,308 | B1 * | 9/2003 | Greenberg et al. | 715/764 |
| 6,727,849 | B1 * | 4/2004 | Kirk et al. | 342/357.14 |
| 6,732,051 | B1 * | 5/2004 | Kirk et al. | 701/216 |
| 6,766,253 | B2 * | 7/2004 | Burns et al. | 702/6 |
| 6,853,909 | B2 * | 2/2005 | Scherzinger | 701/207 |
| 6,920,084 | B2 * | 7/2005 | MacKay | 367/53 |
| 7,062,305 | B1 * | 6/2006 | Cameron et al. | 455/575.1 |
| 7,211,980 | B1 * | 5/2007 | Bruemmer et al. | 318/587 |
| 2003/0112170 | A1 * | 6/2003 | Doerksen et al. | 342/22 |
| 2005/0057745 | A1 * | 3/2005 | Bontje | 356/139.03 |
| 2006/0279727 | A1 * | 12/2006 | Nichols et al. | 356/139.01 |

OTHER PUBLICATIONS

Bloemenkamp et al., The Effect of the Elevation of GPR Antennas on Data Quality, May 14-16, 2003, 2nd International Workshop on Advanced GPR, pp. 201-206.*

Young et al., A Hybrid Laser-Tracking/GPS Location Method Allowing GPR Acquisition in Rugged Terrain, May 2002, The Leasing Edge, pp. 486-490.*

* cited by examiner

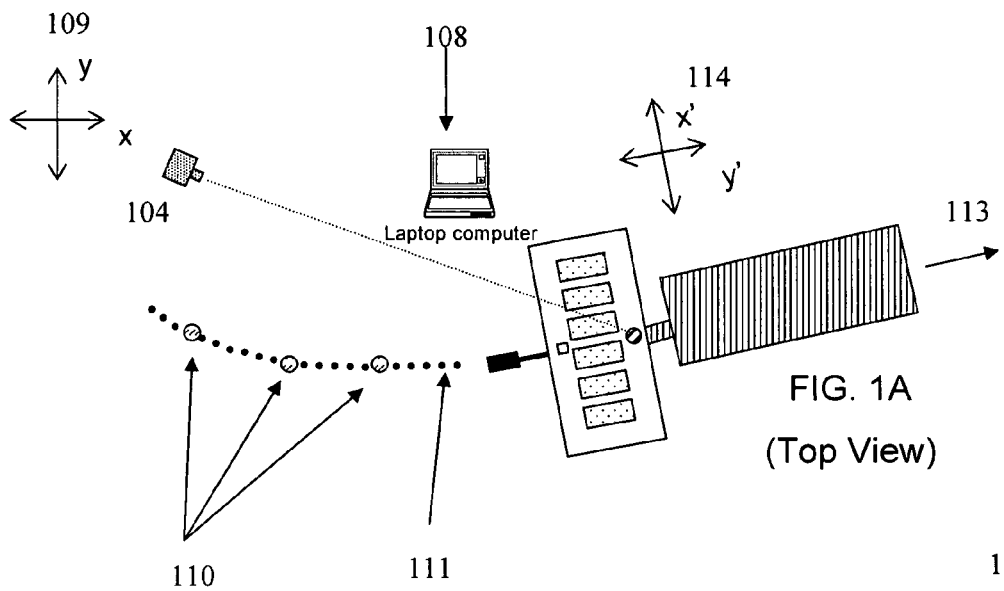
FIG. 1A (Top View)
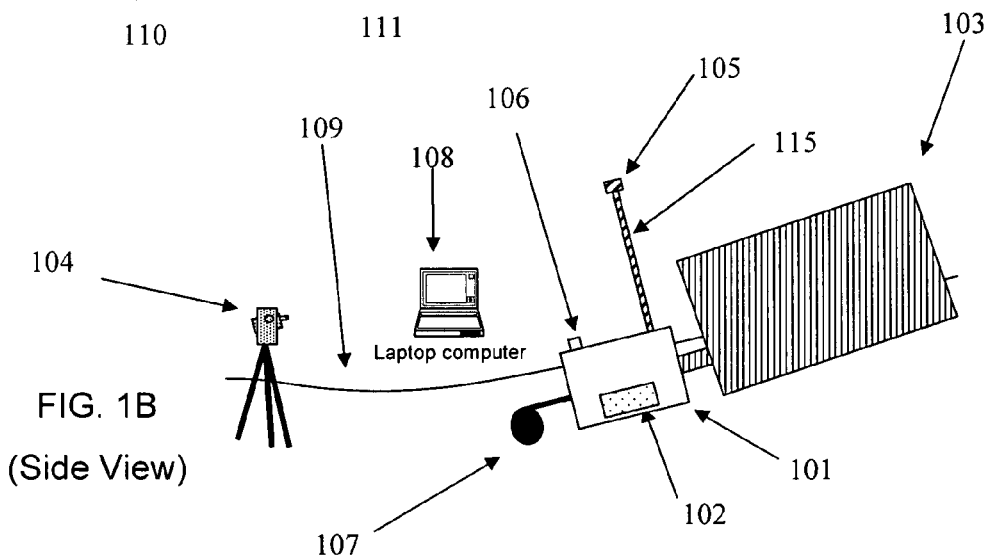
FIG. 1B (Side View)
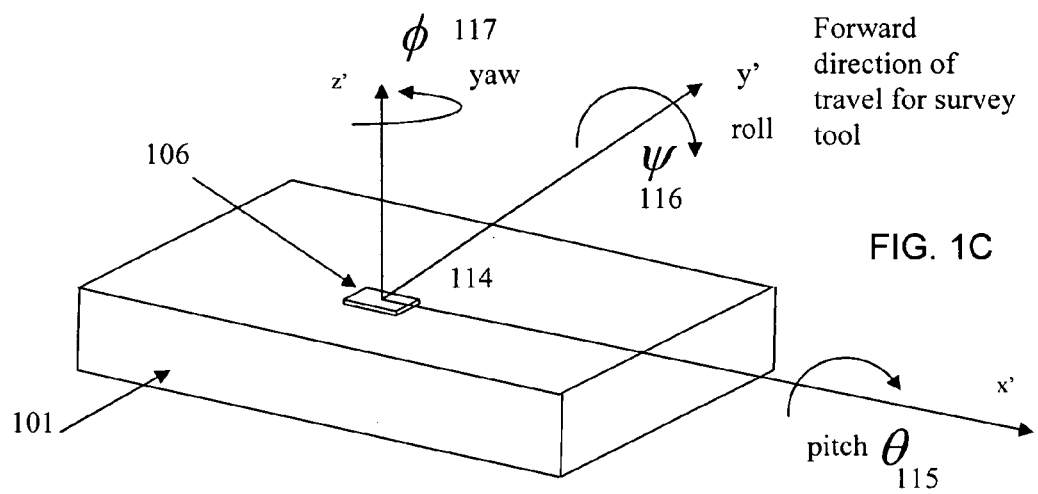
FIG. 1C

Measured and Corrected Data Values

|  | X (ft) | Y (ft) | Z (ft) |
|---|---|---|---|
| Total Station | 0.00 | 0.00 | 0.00 |
| Un-Tilted Position | -7.356 | -9.720 | -0.070 |
| Tilted Position | -5.750 | -8.160 | - 0485 |
| Corrected | -7.395 | -9.758 | -0.067 |
| Pole Height (ft) | 6.50 | | |

Tilt Angles As Measured By 3DM-GX1 IMU

| Roll Angle (degrees) | -17.0 |
|---|---|
| Pitch Angle (degrees) | -11.9 |

FIG. 7

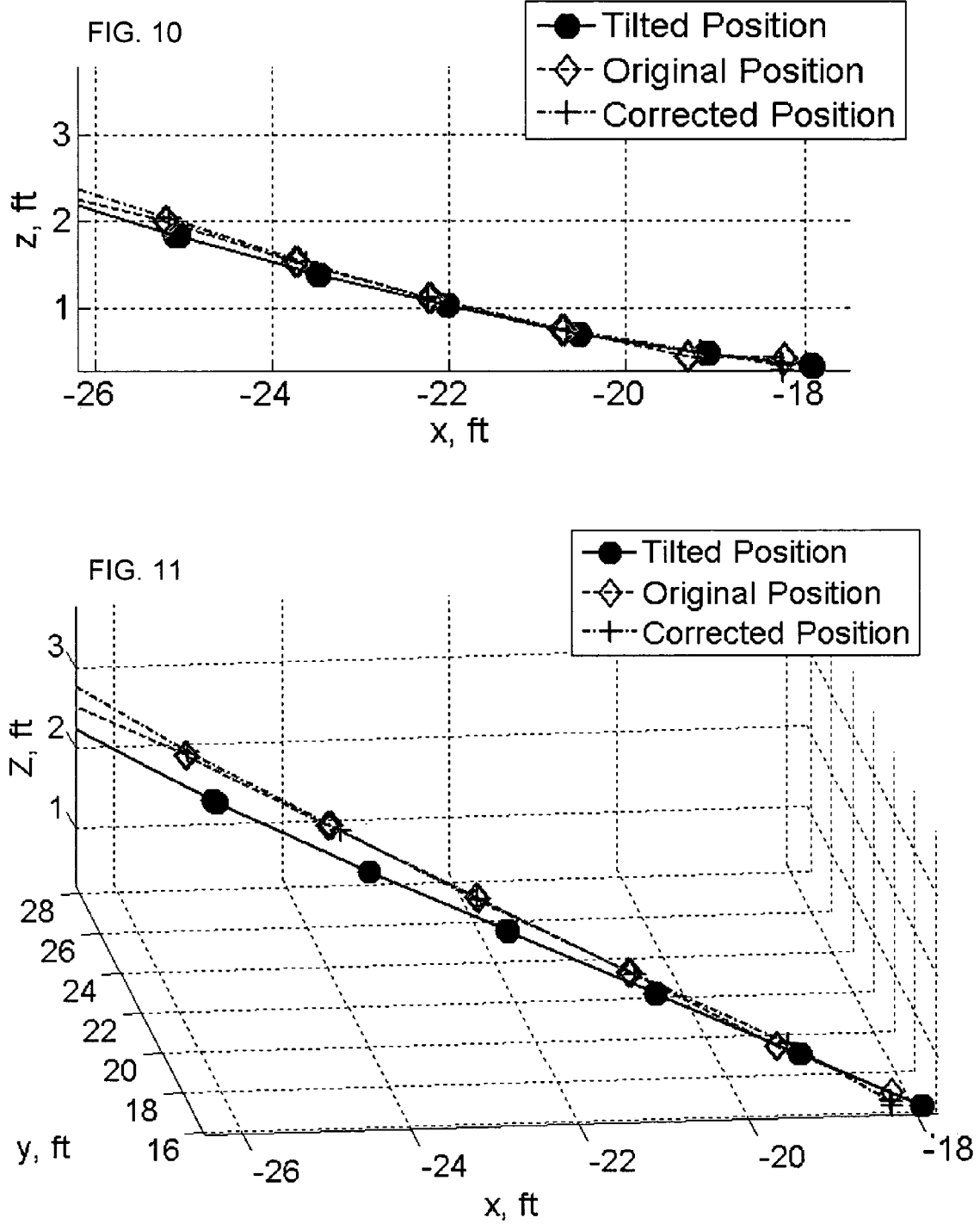

| Position # | Roll Angle, Degrees | Pitch Angle, Degrees |
|---|---|---|
| 1 | 0.86 | 2.80 |
| 2 | -0.84 | 3.22 |
| 3 | -2.22 | 5.42 |
| 4 | -3.94 | 7.94 |
| 5 | -6.21 | 8.86 |
| 6 | --7.75 | 10.02 |
| Pole Height (ft) | 8.0 | |

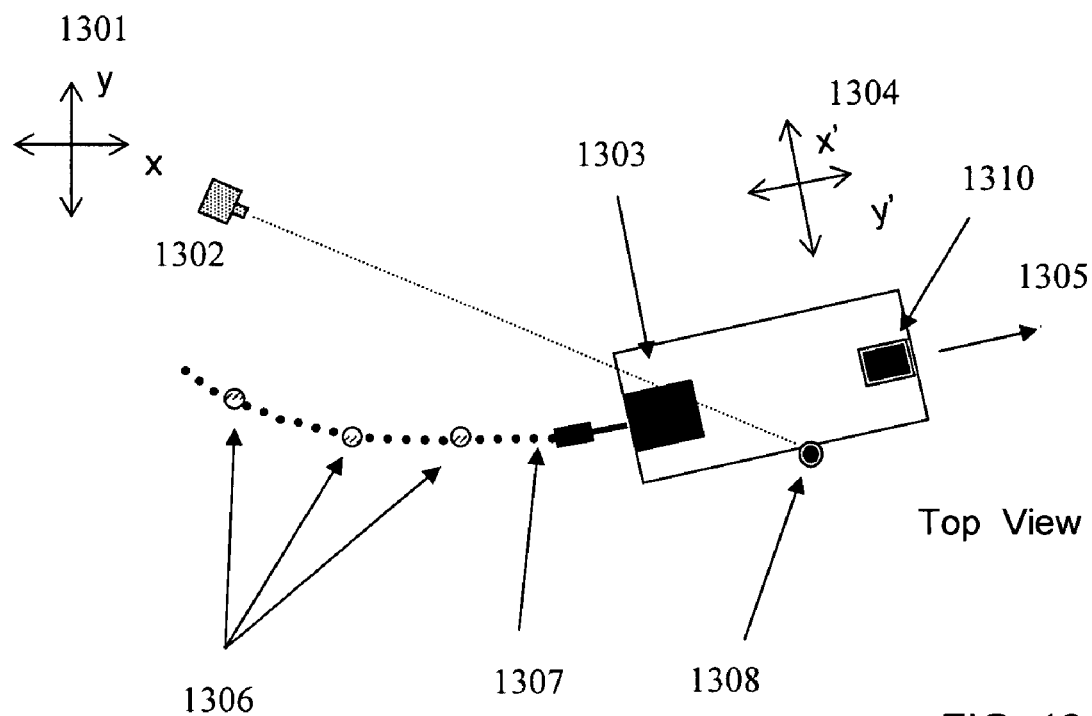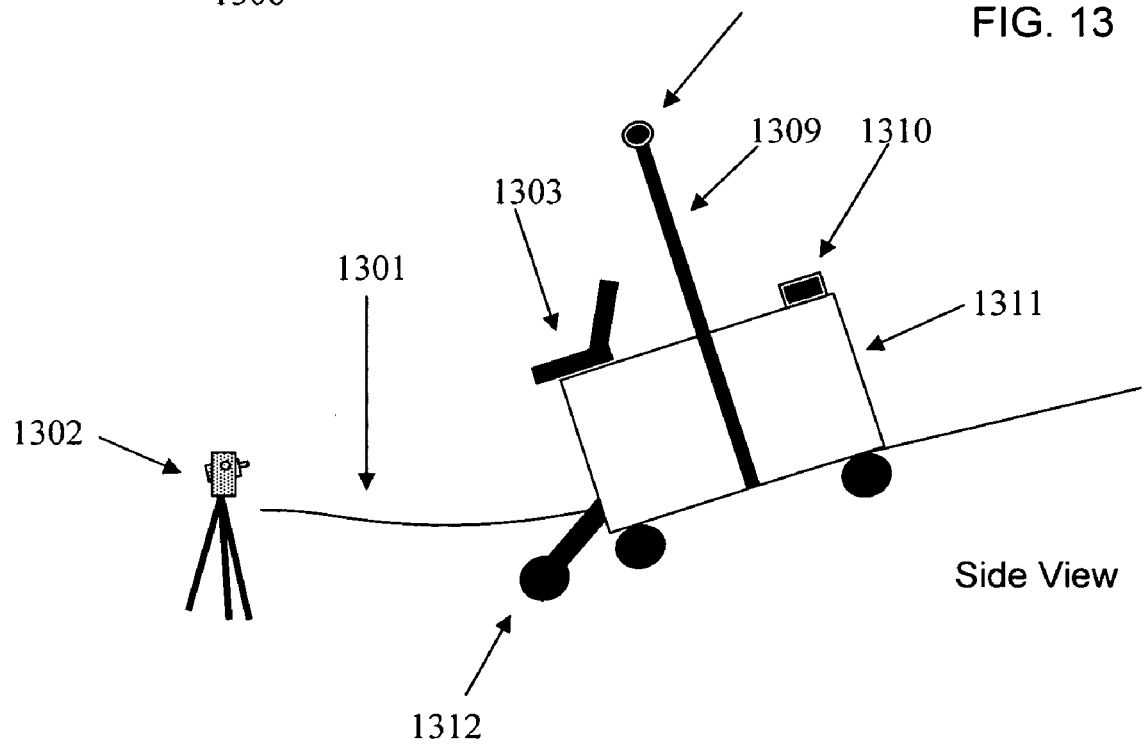
FIG. 13

METHOD FOR CORRECTING A 3D LOCATION MEASURED BY A TRACKING SYSTEM ASSUMING A VERTICAL OFFSET

RELATED APPLICATIONS

This application claims the benefit of U.S. provisional Application No. 60/659,903 filed on Mar. 10, 2005, entitled "method for Correcting a 3D Location Measured by a Tracking System Assuming a Vertical Offset", now expired, the disclosure of which also is entirely incorporated herein by reference.

TECHNICAL FIELD

The present subject matter relates to techniques and equipment to correct location of a survey tool, such as a ground penetrating radar unit, for tilt or offset from a vertical orientation of the tool.

BACKGROUND

A current system for tracking position of a survey instrument or tool, such as the Spectra Precision® Optical TS415 Total Station from Trimble, consists of a fixed ground station and a reflector, which is usually mounted onto a pole. The pole creates a vertical offset from the surface of the region being surveyed. A leveled self-tracking laser theodolite on the ground station sends out a laser that hits the reflector and is bounced back to the ground station. A data processor of the tracking system calculates the x, y, z, and position of the reflector by measuring the time of flight for the bounced laser and the two angles between the ground station and the reflector. The data processor compensates for any vertical offset between the reflector and the target. The data processor, however, does not correct for angular offsets. The surveying pole must be held completely vertical over the target. Most surveying poles are equipped with a "bulls-eye" level to aid in holding the pole completely vertical. This technique is adequate for survey applications that can utilize the vertical pole and reflector, for measurements of relatively fixed positions.

However, there are many applications where it is not feasible or does not make sense to have the pole vertical to the measured target. One such application would be tracking a moving vehicle with an attached sensor platform (survey tool) that has a rigidly attached survey pole, as the vehicle moves over an irregular surface. Often, ground or street surfaces, for example, have non-zero angles with respect to the horizontal (that is to say non-zero inclination). As the vehicle moves over such a surface, the pole remains perpendicular relative to the vehicle, typically with respect to the surface; but it will not always be vertical. In such an application, the tracking system would record erroneous position data whenever the vehicle encountered a non-horizontal surface.

In a similar fashion as described above, a GPS receiver could be employed to track a survey tool. And similarly, if the GPS receiver is mounted on a pole or housing that is rigidly affixed to the survey tool with some vertical offset from the surface, the GPS receiver would record erroneous position data whenever the vehicle encountered a non-horizontal surface.

A method to try and compensate for the non-horizontal surface effects would be to gimble-mount the survey pole (or GPS antenna). However, this still would not solve the problem. Although gimble mounting would keep the survey pole (or GPS antenna) vertical, the position of the bottom of the pole would always be changing relative to the survey tool as the contour of the ground or other surface varied.

SUMMARY

A method is described for tilt correction of a three-dimensional (3D) location measured by a tracking system associated with a survey tool. Systems and data processing equipment/programs, which utilize aspects of the correction technique, are also disclosed.

In the disclosed examples of a survey system, an inertial measurement unit or "IMU" (which measures pitch and roll angles and optionally yaw angle), a dual axis inclinometer or two single axis inclinometers are used to measure the amount a survey tool is tilted. In a specific example, a tracking station is used to track the survey tool; and a pole with a reflector is attached to the survey tool. The tracking station records the 3D position of the survey tool, albeit with angular offset errors. Similarly, a GPS receiver could be used to track the system, although the data will incorporate errors due to angular offsets as the tool moves or is re-positioned and provides measurement data and corresponding position data. The IMU or tilt sensor(s) measure the angular offsets. All data is recorded onto a local computer or the like. The tilt (orientation) data is used to correct position data to compensate for the angular offsets and thereby reduce or eliminate the errors. Data from the tracking station (or GPS) is merged with tilt data after surveying is completed and post processed either on the local computer or transferred to a desktop computer for later position correction processing. It should also be noted that in another implementation the tilt data and position data could be merged in real-time (as data is collected), and the position correction could occur in hardware using an embedded system, or on a local computer using wireless data transfer. Subsequent processing of the measurement data can then use the corrected position data, e.g. for merging with the measurement data to produce more accurate images of subsurface features or objects.

A method of processing position data from a survey involves obtaining position data corresponding to a point on a surface of a region to be surveyed, at which a survey tool is positioned; and obtaining angular offset data. The offset data represents offset of the survey tool from a normal orientation, e.g. vertical, at the point on the surface of the region. The method then entails correcting the corresponding position data, based on the angular offset data.

The tool may be a simple pole, contact probe or the like, in which case the corrected position data itself is the desired survey data. However, applications discussed below also involve physical measurements of properties of the surveyed region taken at different points on the surface of the region.

Hence, a method of generating measurement data and position data from a survey of a region may involve obtaining measurement data representing a measured physical property of the region from a survey tool, when the survey tool is positioned at various points on a surface of the region. Survey tool position data, corresponding to each of the points on the surface of the region, also is obtained. Angular offset data, representing offset of orientation of the survey tool from a normal orientation at the points on the surface of the region, caused by variations in inclination of the surface, enables correction of the corresponding position data.

In a typical application, a computer or the like processes the measurement data based on the corrected corresponding position data. This processing, for example, may generate images of features or objects below the surface, e.g. of subterranean features or objects buried under a portion of a road or the ground.

In the examples, the angular offset data represents variations in orientation of the survey tool due to variations of the surface with respect to horizontal. In typical systems, position data corresponding to each of the points corresponds to a position offset from the surface, e.g. due to an offset of a position detection element from the surface. In such cases, the angular offset data represents an angle of an axis of this position offset, relative to a vertical orientation over the surveyed region. Examples are disclosed that measure the angular offset data with respect to two or more axes of the survey tool.

Although the survey tool could be a relatively static device moved manually from point to point, the examples of the tool utilize a moveable platform, so that the survey tool can traverse the surface of the region. With such a platform, the various types of data are obtained at least periodically, e.g. at regular intervals or continuously, as the survey tool traverses the surface of the region.

The detailed description also describes a survey system. Such a system might include a survey tool and a position detection device that is responsive to position of the survey tool. An inclinometer, coupled to the survey tool, provides angular offset data in response to orientation of the survey tool, representing offset of the survey tool from a normal orientation. A data processor corrects the position data, based on the angular offset data.

The survey system may simply provide position data regarding one or more points on the surface. For such applications, the tool is a mechanism for locating an element of the position detection device at a desired point, such as a survey pole or contact probe. However, many applications will also involve associated sensors for measurements of a property of a region to be surveyed, such as a sub-surface characteristic as might be measured and processed to detect buried objects or subterranean features.

In the examples, the survey tool comprises a movable platform and one or more sensors mounted on the moveable platform for detecting the physical property of the region platform moves over the surface. The position detection device includes an element, e.g. a reflector or a GPS receiver, mounted on the platform at a location on the platform that will be offset from the surface of the region when the survey tool performs measurements. The angular offset data represents an angle of an axis of the offset of the element of the position detection device, relative to a vertical orientation over the region.

The system may use a variety of sensing technologies. Disclosed examples include a ground penetrating radar (GPR) array, an array of electromagnetic induction antennas, an array of magnetometers, an array of vibrometers and an array of optical sensors. There are also a variety of ways to implement the inclinometer. Examples of the inclinometer include an inertial measurement unit (IMU), a dual axis inclinometer and two single axis inclinometers. Examples of the position detection device include a self-tracking laser theodolite ground station with a reflector attached to the survey tool for reflecting a laser beam from the ground station back to the ground station; and a GPS receiver attached to the survey tool.

Aspects of the disclosed technology also may be implemented in a data processing system and/or programming for such a system. A data processing system might include at least one programmable processor and programming executable by the at least one processor. Execution of the programming causes the processor(s) to implement functions. The functions include receiving measurement data representing a measured physical property of a region, when a survey tool is positioned at various points on a surface of the region; and receiving survey tool position data corresponding to each of the points on the surface of the region. The functions also include receiving angular offset data, representing offset of orientation of the survey tool from a normal orientation, at each of the points on the surface of the region. The processor can correct the corresponding position data, based on the angular offset data.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 1A to 1C provide high-level functional illustrations of a survey tool system, with tool position detection and correction for vertical offset or tilt angle of the tool.

FIG. 7 is a table showing the results for tilt correction performed on experimental data in the lab.

FIG. 10 is a 2D (XZ plane view) plot depicting the results for tilt correction performed on data from field experiments using a mock survey tool setup.

FIG. 11 is 3D plot depicting the results plot depicting the results for tilt correction performed on data from field experiments using a mock survey tool setup.

FIG. 13 depicts the experimental setup for the field test using a mock survey tool.

DETAILED DESCRIPTION

Figure 2:
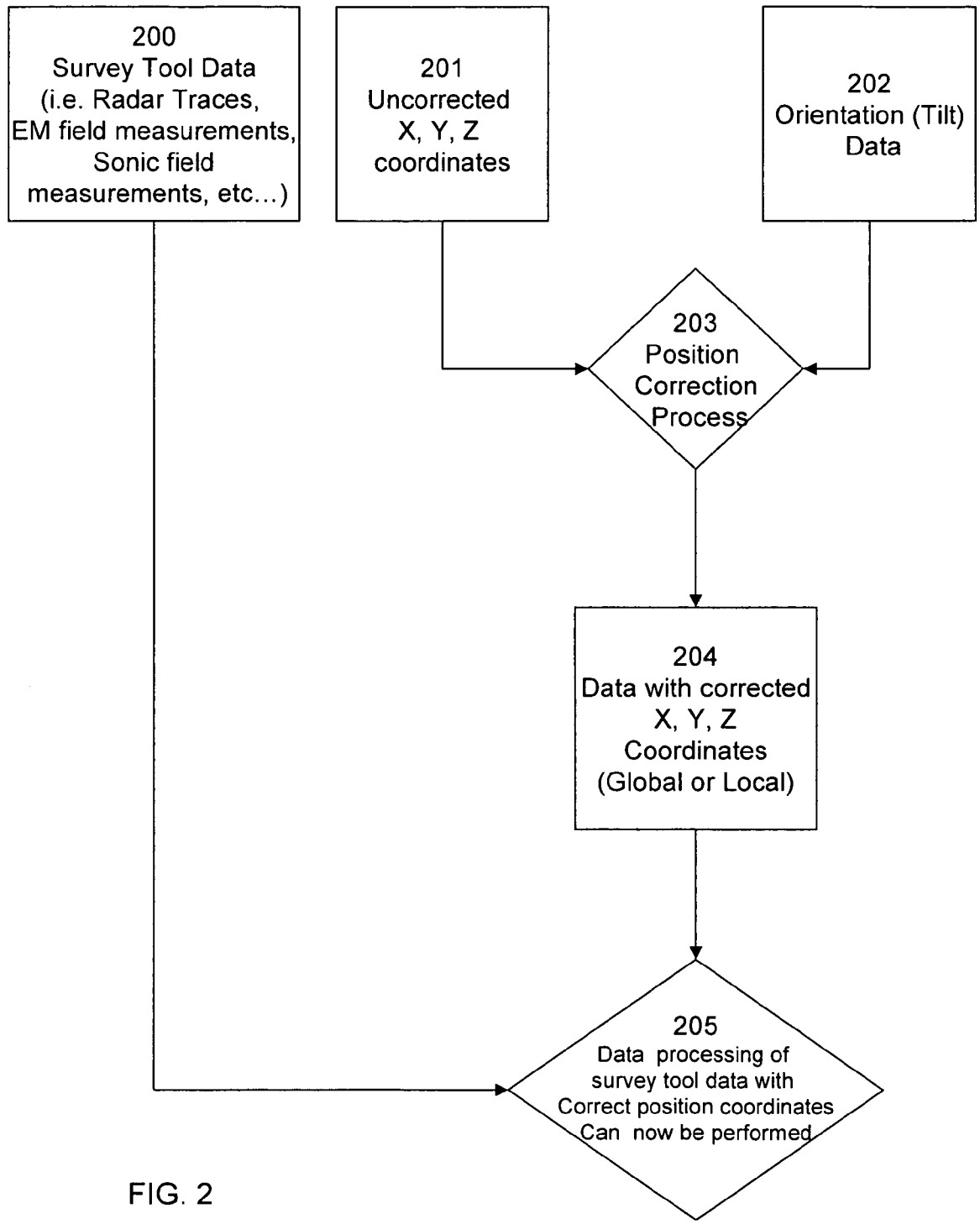
FIG. 2 is a flow chart illustrating a high-level view data collection and processing operation.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The various methods and systems disclosed herein relate to correcting position data regarding a moveable survey tool, to allow for tilt or offset of the tool from a normal orientation (e.g. from the vertical), for example, as may be caused by the angle of the ground over which the survey tool moves. The position data correction techniques disclosed herein may be used with various implementations of survey tools. A survey tool could be composed of any of the following examples but is not limited to:

a survey pole;
an array of ground penetrating radar antennas and/or receivers;
an array of electromagnetic induction antennas;
an array of magnetometers;
an array of vibrometers;
an array of optical sensors;
any array of sensors rigidly mounted to a moving platform; and
any sensor mounted on a moving platform.

Reference now is made in detail to the examples illustrated in the accompanying drawings and discussed below. FIGS. 1A and 1B illustrate an example of the system, showing top and side views of the functional elements in operation. FIG. 1C is an isometric view of the survey tool showing a number of relevant angles and the like.

The tilt correction may be applied to a variety of survey tools that traverse surfaces that may or may not be horizontal. Consider a survey tool 101 that consists of an array of Ground Penetrating Radar (GPR) Transmitter(s) and Receiver(s) 102 that is towed by a vehicle 103. The GPR transmitter produces a pulse of electromagnetic radiation that is transmitted into a region of the ground over which the tool 101 is positioned or moving. The antennas receive the back-scattered electromagnetic radiation from the pulse.

The system includes one or more elements for determining the position of the survey tool 101, at the various points or positions of the tool 101 on or above the surface of the ground that the system is surveying. For example, the system might use a GPS receiver. For purposes of discussion of the example, the system uses a self-tracking laser theodolite and an associated pole mounted reflector or prism. Specifically, a Spectra Precision® Optical TS415 Total Station 104 from Trimble is used to track and record the 3D position of the survey tool. A tracking prism 105 is mounted on a pole 115 that is rigidly affixed to the survey tool 101. When the survey tool 101 is on a horizontal surface, the pole 115 is vertical.

Although ground or street surfaces often are horizontal, such surfaces often have non-zero angles with respect to the horizontal (that is to say non-zero inclination). In applications for surveying roads or other surfaces on the ground or the like, the normal orientation of the tool would be vertical, so that the offset from the surface to the element of the position detecting device (e.g. tracking prism 105 or other reflector or a GPS receiver) on the tool 101 would be a vertical offset perpendicular to the surface the tool traverses. For such applications, one or more inclinometers are provided for detecting angular offset from the normal vertical orientation, of a system axis that is perpendicular to the surface the tool traverses and thus of the position offset.

A variety of different types of sensor may be used. In the example, a Microstrain 3DM-GX1 IMU 106 is mounted to the surface of the GPR and is used to measure the pitch, roll, and yaw angles of the system. The IMU 106 is best mounted so that one axis is aligned to the direction of motion of the survey tool 113. This in turn defines the local coordinate system for the IMU 114 at any given point along the survey path 111. It should be noted that the orientation of the IMU axis does not need to be mounted with one axis in the direction of motion. The only requirement is to have the IMU/tilt sensor(s) rigidly mounted in a known orientation that is in the same plane as the surface of the survey tool for which tilt measurements are to be made.

As the system moves across a surface 109 of the surveyed region of the ground or a road or the like, a survey wheel 107 attached to the survey tool 101 triggers data collection at a predetermined spacing interval. Orientation data (i.e. angular offset) and ground penetrating radar data are saved onto a local laptop computer 108 (or other data storage media). The data is transferred to the laptop computer either through cabling or wireless data communications. After the survey is completed, position data from the Total Station 104 and orientation data from the IMU 106 are transferred to the same computer. This computer may be the laptop 108 used during the data collection or it may be a desktop computer or host computer (not shown) at another location. At this point, processing of the data can occur.

The programmable data processing device that processes the position data and possibly the ground penetrating radar data may be essentially any type of general purpose computer. Typically, such a device includes one or more central processing units (CPUs) for processing data in accord with program instructions. The device also typically includes a number of different types of memories and mass storage devices, for storing data and instructions. If the computer system will provide a direct user interface, e.g. as would the laptop used for data collection, it may also include or connect to any convenient display or printer as well as input devices such as a touchpad, keyboard, mouse, trackball or the like. The components contained in the computer system(s) are those typically found in general purpose computer systems used as servers, workstations, personal computers network terminals, and the like. In fact, these components are intended to represent a broad category of such computer components that are well known in the art that may be used for either or both of the data collection function and the data processing function discussed herein.

FIG. 2 is a flow chart illustrating a generic high-level view of data collection and processing. Survey tool data is collected in step 200. Uncorrected position data is collected in step 201. Orientation data is collected in step 202. The tilt data and position data are merged in step 203 and processed. Corrected position data is produced in step 204. In step 205 data processing of survey tool data with corrected position data is performed, e.g. to produce maps or images of subsurface objects from the ground penetrating radar data. Data processing is currently implemented using Matlab 7.0 programming code. However, many other suitable computer programming languages could be used such as C, C++, FORTRAN, Mathematica and Visual Basic, for example.

Figure 3:
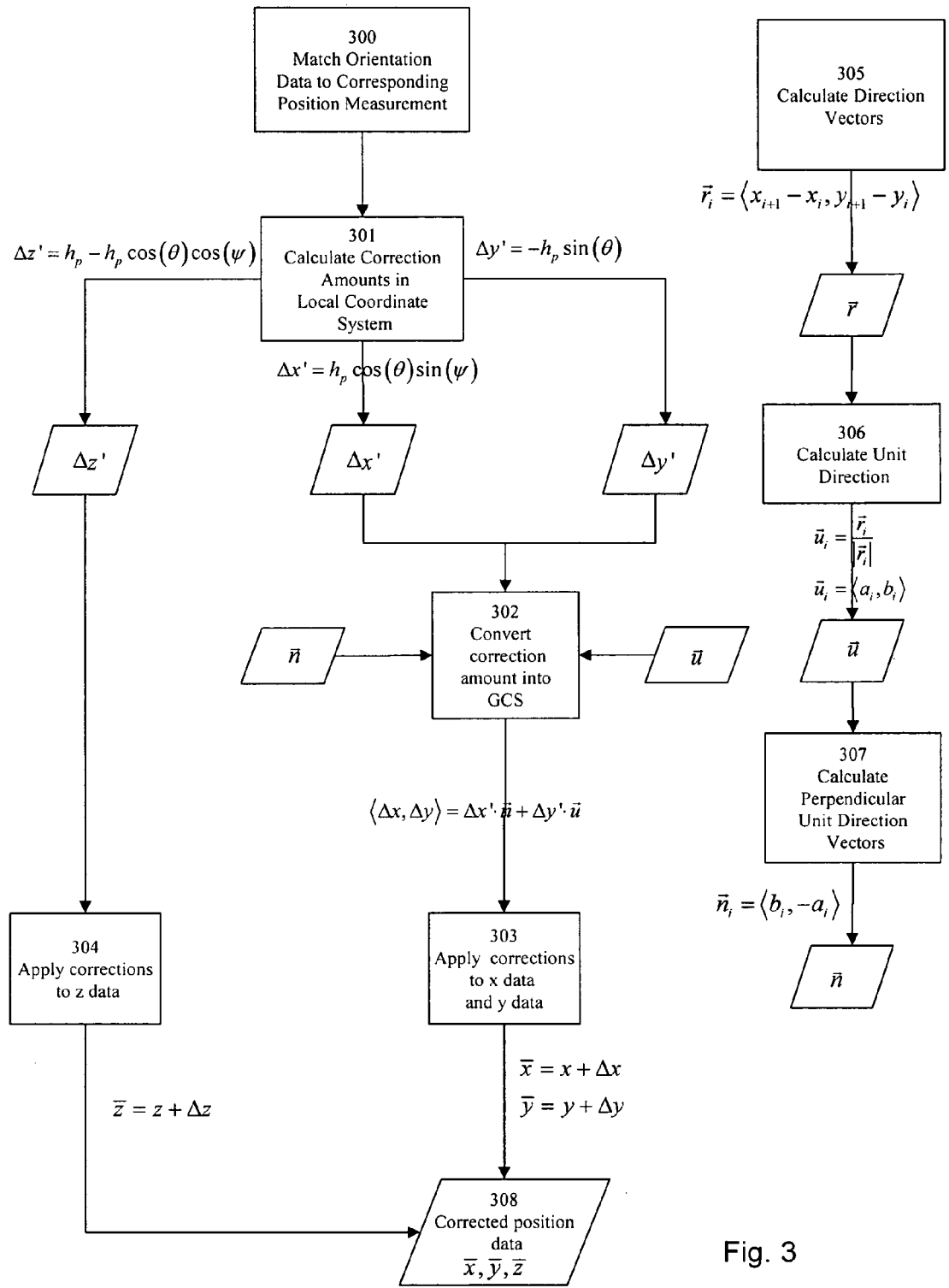
FIG. 3 is a flow chart illustrating the procedure used to correct for angular offset.

The tilt correction processing is illustrated as a flow chart in FIG. 3. In step 300, tilt angle measurements are matched with the corresponding geodetic survey point. In step 301, $\Delta x'$, $\Delta y'$, and $\Delta z'$, (the x', y', z' offsets) are calculated using the following equations $$\Delta x' = h_p \cos(\theta)\sin(\psi)$$

$$\Delta y' = -h_p \sin(\theta)$$

$$\Delta z' = h_p - h_p \cos(\theta)\cos(\psi) \quad (1)$$

$h_p$ 815 is the height of the survey pole 115 theta ($\theta$) 115 is the pitch angle and psi ($\psi$) 116 is the roll angle of the survey tool 101 as recorded by the 3DM-GX1 IMU 106 in the IMU's local (x',y,z') coordinate system 114. In step 305, the direction vectors $\vec{r}_i$ are calculated using the following equation $$\vec{r}_i = \langle x_i + 1 - x_i, y_i + 1 - y_i \rangle \quad (2)$$

where $x_i$ and $y_i$ are the uncorrected position measurements.

In step 306 the unit direction vectors, $\vec{u}_i$, and unit direction vectors $\vec{n}_i$ (a unit direction vector perpendicular to $\vec{u}_i$), are calculated using the following equations $$\vec{u}_i = \frac{\vec{r}_i}{|\vec{r}_i|} \quad (3)$$

$$\vec{u}_i = \langle a_i, b_i \rangle$$

$$\vec{n}_i = \langle b_i, -a_i \rangle$$

for each geodetic survey point 110 along the survey path 111. In another implementation direction vectors could be calculated from the "yaw" angle measurement phi ($\phi$) 117 from the IMU 106.

In step 302 the correction amounts $\Delta x'_i$ and $\Delta y'_i$ are converted into the survey tool coordinate system with the following formula $$\langle \Delta x_i, \Delta y_i \rangle = x'_i \cdot \vec{n}_i + \Delta y'_i \cdot \vec{u}_i \quad (4)$$

Under the current implementation $\Delta z = \Delta z'$ and no transformation is necessary. Next, in steps 303, and 304 the position measurements are corrected using the following equations $$\bar{x}_i = x_i + \Delta x_i$$

$$\bar{y}_i = y_i + \Delta y_i$$

$$\bar{z}_i = z_i + \Delta z_i \quad (5)$$

Where $\bar{x}_i$, $\bar{y}_i$ and $\bar{z}_i$ are the final corrected position measurements.

The teachings outlined above may be implemented as methods of processing data from a survey tool and associated offset angle or tilt data, to provide the correction of the position data of the survey tool as may be used to process data from the survey tool, e.g. for visualization, processing and interpretation of ground penetrating radar data, electromagnetic field data, magnetometer data and acoustic data. Those skilled in the art will recognize, however, that the teachings also may be embodied in systems for processing data, alone or in combination with the survey tool and the position detector equipment and inclinometer. The teachings may also be embodied in a software product, essentially a program, for causing a computer or other data processing device to perform the data processing outlined above.

Terms such as "machine-readable medium" and "computer-readable medium" refer to any medium that participates in providing instructions and/or data to a programmable processor, such as the CPU of a personal computer, server or host computer that may process the position data and/or the GPR data. Such a medium may take many forms, including but not limited to, non-volatile media, volatile media, and transmission media. Non-volatile media include, for example, optical or magnetic disks. Volatile media include dynamic memory, such as main memory or cache. Physical transmission media include coaxial cables; copper wire and fiber optics, including wired and wireless links of the network and the wires that comprise a bus within a computer or the like. Transmission media, however, can also take the form of electric or electromagnetic signals, or acoustic or light waves such as those generated during optical, radio frequency (RF) and infrared (IR) data communications.

Various forms of machine-readable media may be involved in carrying one or more sequences of one or more instructions to a processor for execution. For example, all or portions of the software to perform the tilt correction of survey tool position data and/or relate image processing based on the GPR data from the survey tool may at times be communicated through the Internet, an Intranet, a wireless communication network, or various other telecommunication networks. Such communications, for example may serve to load the software from another computer (not shown) into the data collection computer or other computer that processing the collected data, or into another processing element.

Figure 4:
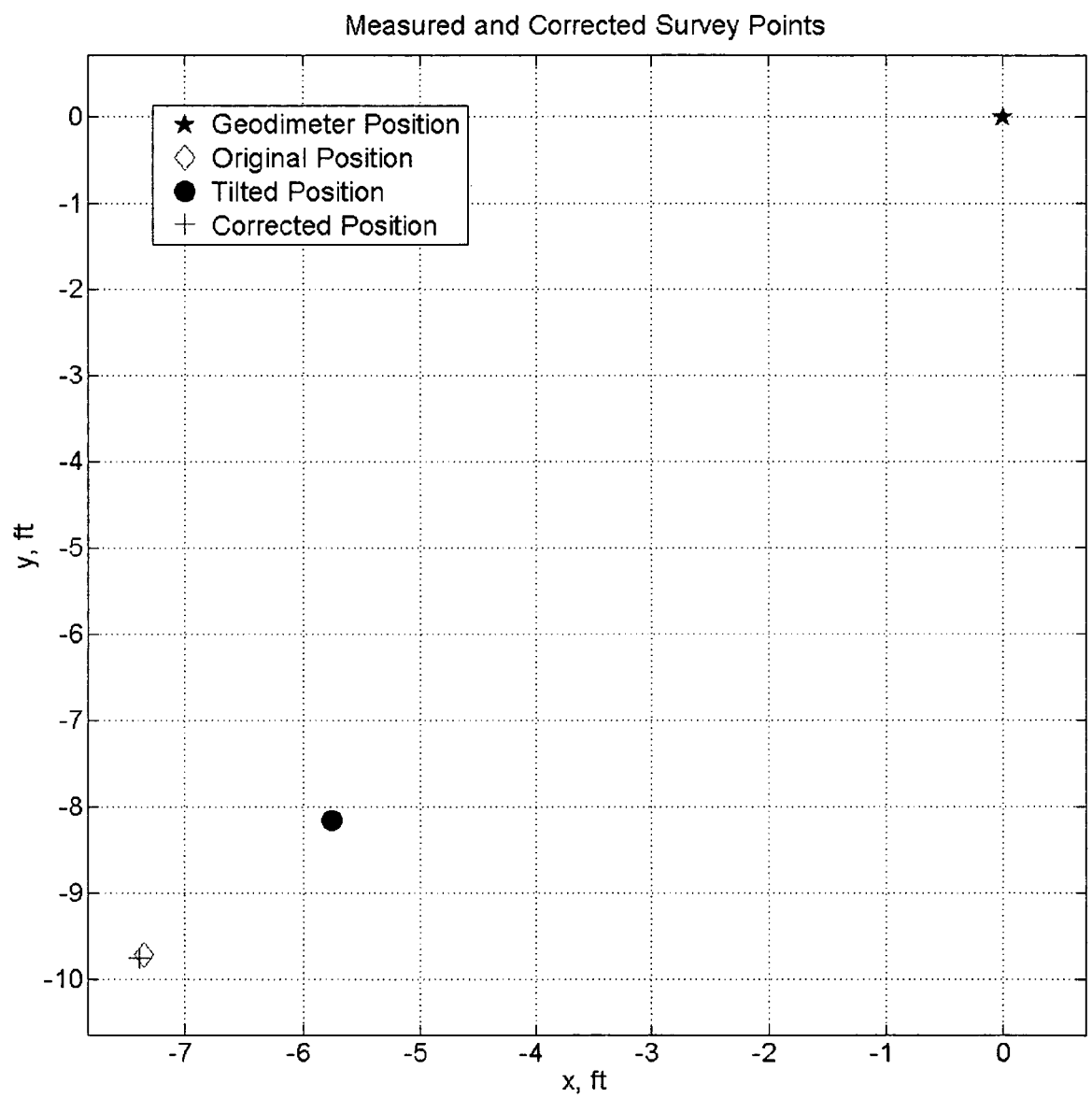
FIG. 4 is a 2D (XY plane view) depicting the results for tilt correction performed on experimental data in the lab.
Figure 5:
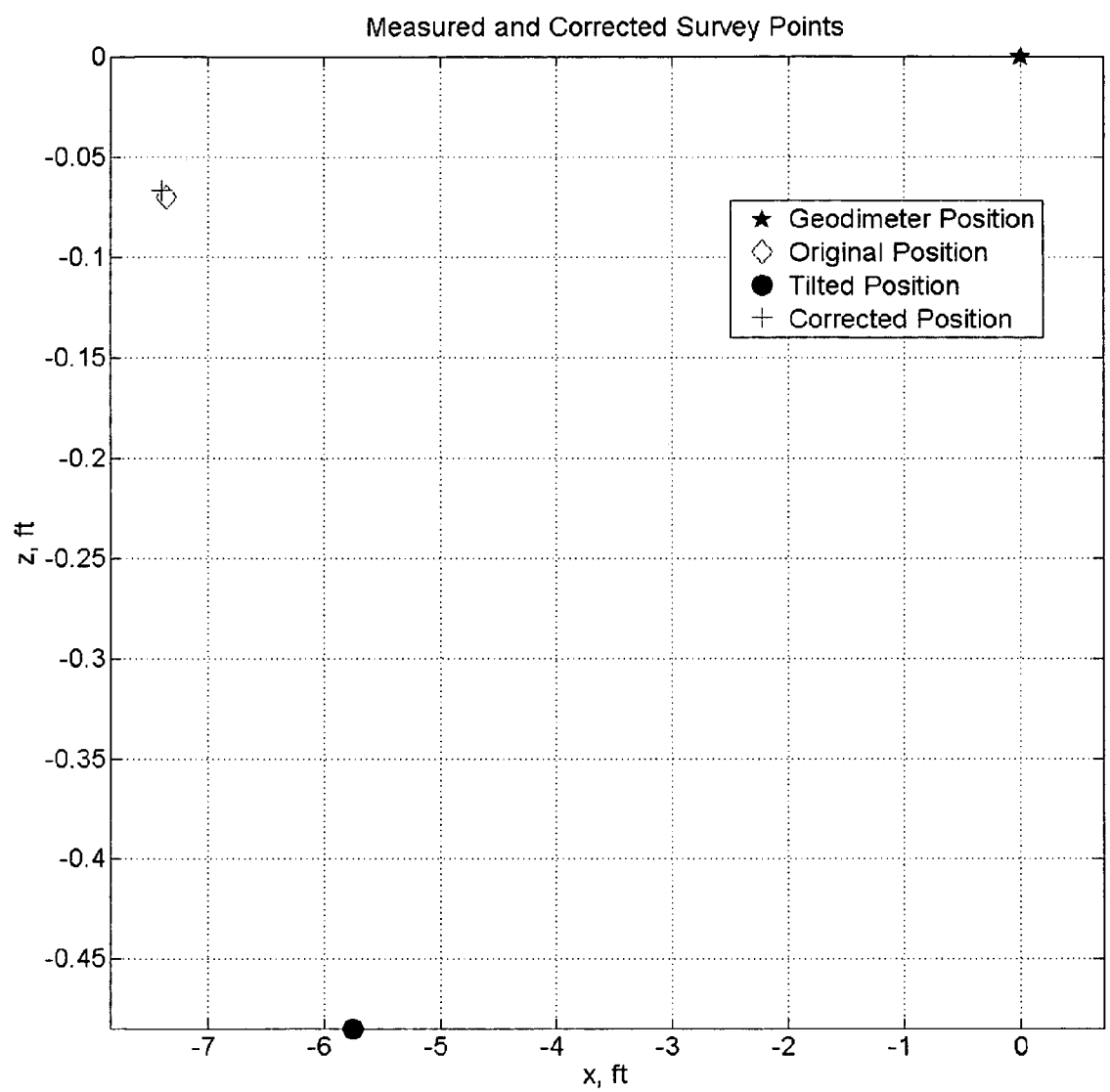
FIG. 5 is a 2D plot (XZ plane view) depicting the results for tilt correction performed on experimental data in the lab.
Figure 6:
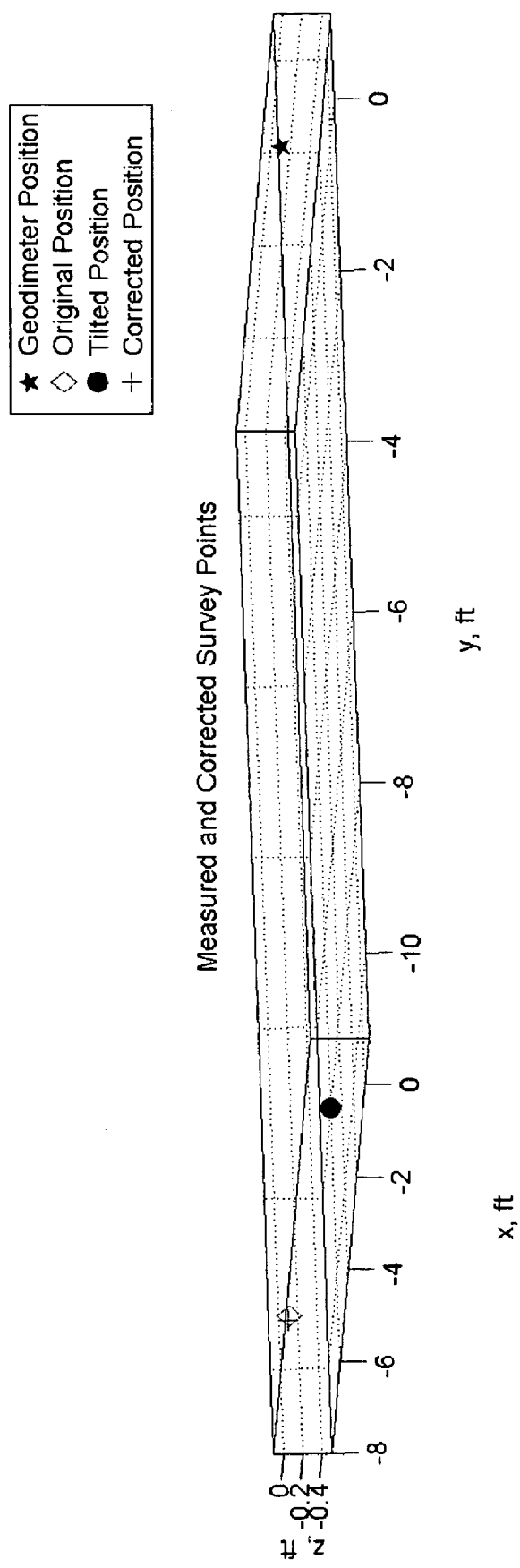
FIG. 6 is a 3D plot depicting the results for tilt correction performed on experimental data in the lab.
Figure 8:
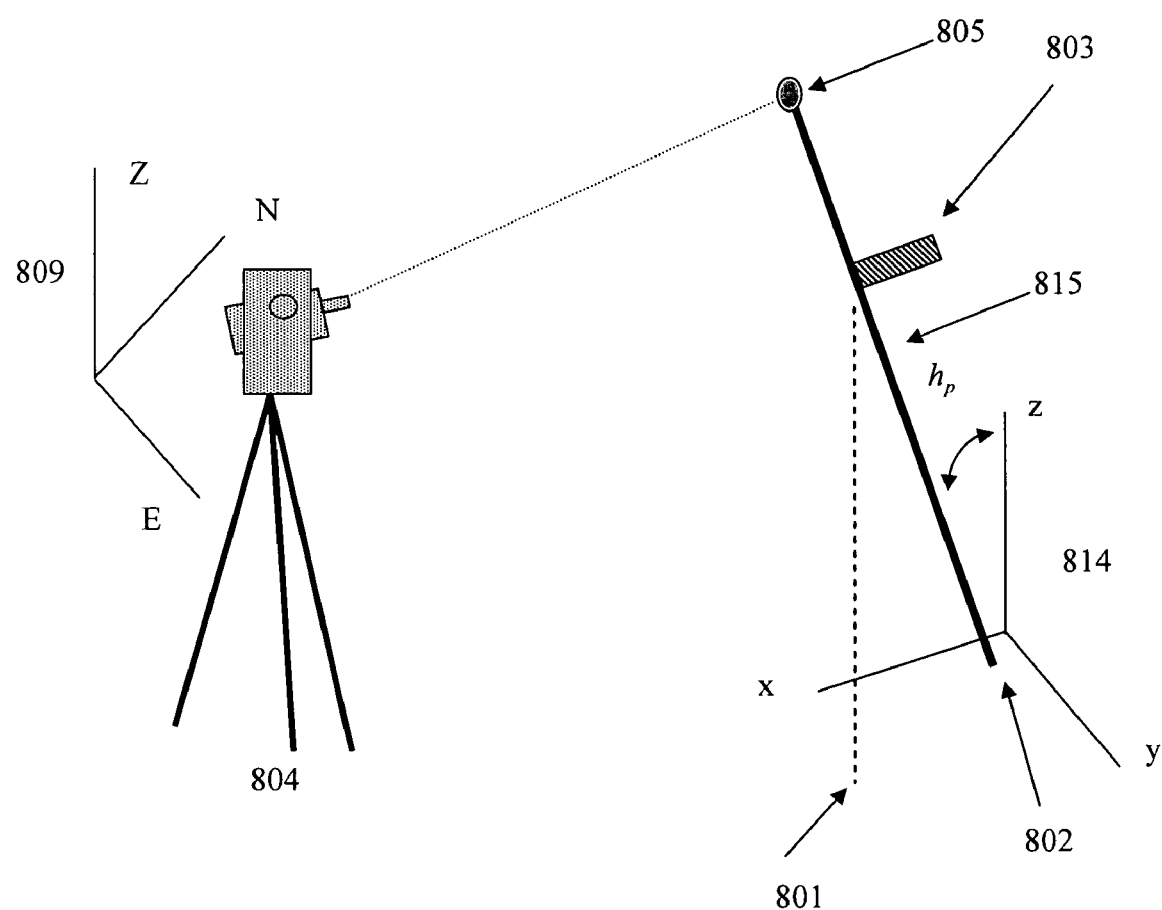
FIG. 8 depicts the experimental setup for a laboratory test.
Figure 9:
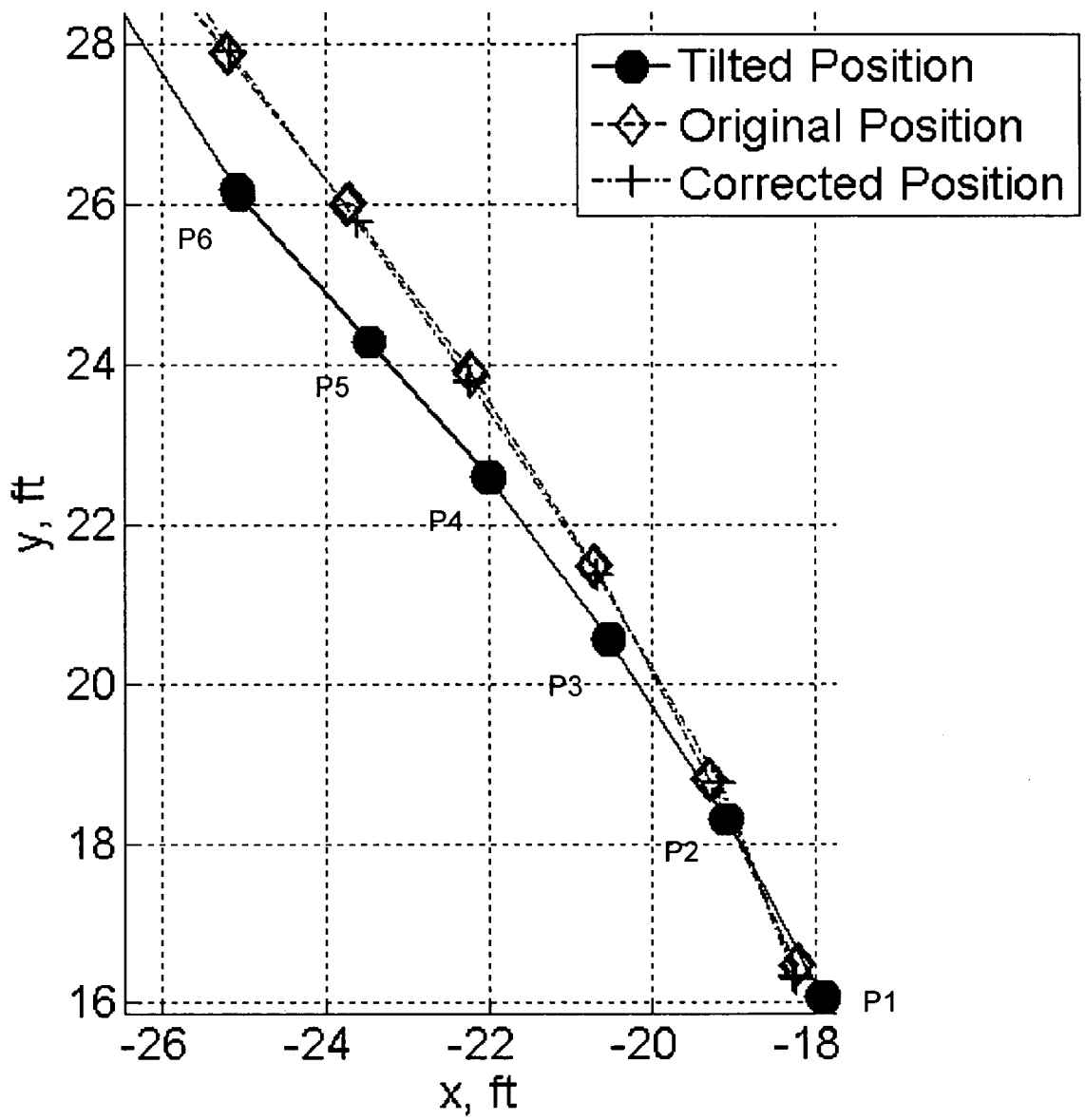
FIG. 9 is a 2D (XY plane view) plot depicting the results for tilt correction performed on data from field experiments using a mock survey tool setup.

FIG. 4, FIG. 5, and FIG. 6 depict the results for experiments performed in the lab to test the validity of the tilt sensor position correction procedure. FIG. 7 is a table of the results of the experiment and a table of measured tilt angle values. FIG. 8 depicts the experimental set up.

A survey pole 815 with a reflector prism 805 of height $h_p$=6.5 ft was tilted with a roll angle ($\psi$) 116 of $-17.0$ degrees and a pitch angle ($\theta$) 115 of $-11.9$ degrees in its local x and y coordinates 814, respectively. The tilt angles were measured by using a Microstrain 3DM-GX1 IMU 803 which was rigidly affixed to the survey prism pole 815. A Trimble Precision 600 Geodimeter 804 was used to collect the position data. This data was recorded as Northing, Easting and Elevation data in its local coordinate system 809. The Geodimeter was set-up approximately 12 feet away from the actual survey position 802. 801 marks the spot that was actually measured by the Geodimeter. Data were also collected with the survey pole 815 held in a vertical position. This was used as the "original" position. The Geodimeter and tilt data was then input into a local desktop computer. Matlab programming language was used in implementing the tilt correction algorithm as outlined in FIG. 3. Its is evident from the results shown in FIG. 4, FIG. 5, FIG. 6, and FIG. 7, that the algorithm works well to correct the position data.

FIG. 9, FIG. 10, FIG. 11 and FIG. 12 depict the results for experiments performed in the field with a mock survey tool to further test the validity of the correction procedure. FIG. 13 depicts the experimental set up for the field test.

A survey pole 1309 of height $h_p$=8.0 ft with a reflector prism 1308 is rigidly affixed to the side of a mock survey tool 1311. The mock survey tool 1311 was pushed along a surface 1301. A Trimble Precision 600 Geodimeter 1302 was used to collected position data at fixed intervals 1306 along the survey path 1207. Pitch ($\theta$) 115 and roll angles ($\psi$) 116 were measured by a Microstrain 3DM-GX1 IMU 1310. The IMU 1310 was rigidly affixed to the surface of the mock survey tool 1311 with the IMU's 1310 y'-axis aligned in the direction of motion 1305 of the mock survey tool 1311. Tilt data collection was triggered by a survey wheel 1312 at fixed intervals. Tilt data was recorded on a laptop computer 1303. Tilt data and position data was merged onto a local computer and processed. Matlab programming language was used in implementing the tilt correction algorithm as outlined in FIG. 3. Its is evident from the results shown in FIG. 9, FIG. 10, FIG. 11, and FIG. 12 that the tilt correction procedure works in a mock field test.

Figures 12, 15:
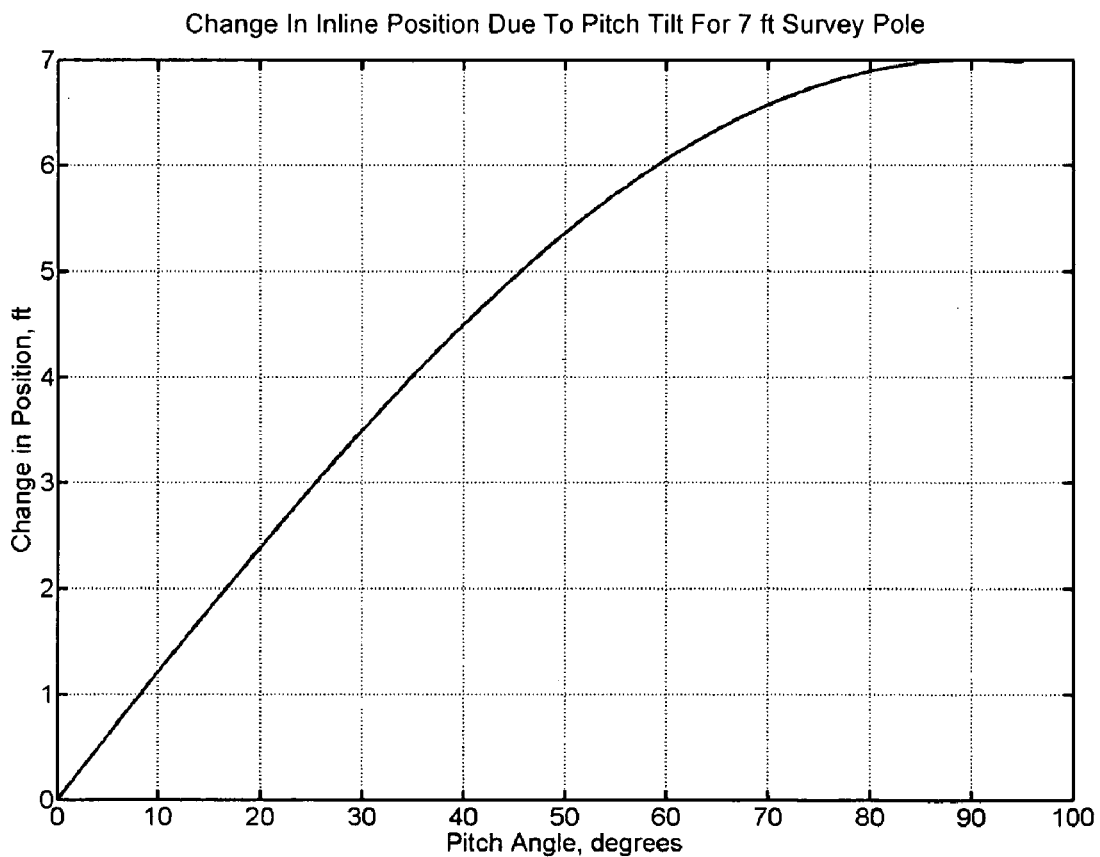
FIG. 12 is a table showing the measured tilt angles and recorded parameters for tilt correction performed on data from field experiments using a mock survey tool setup.
FIG. 15 illustrates the expected deviation in inline position measurements for various pitch tilt angles for a 7 ft prism pole.
Figure 14:
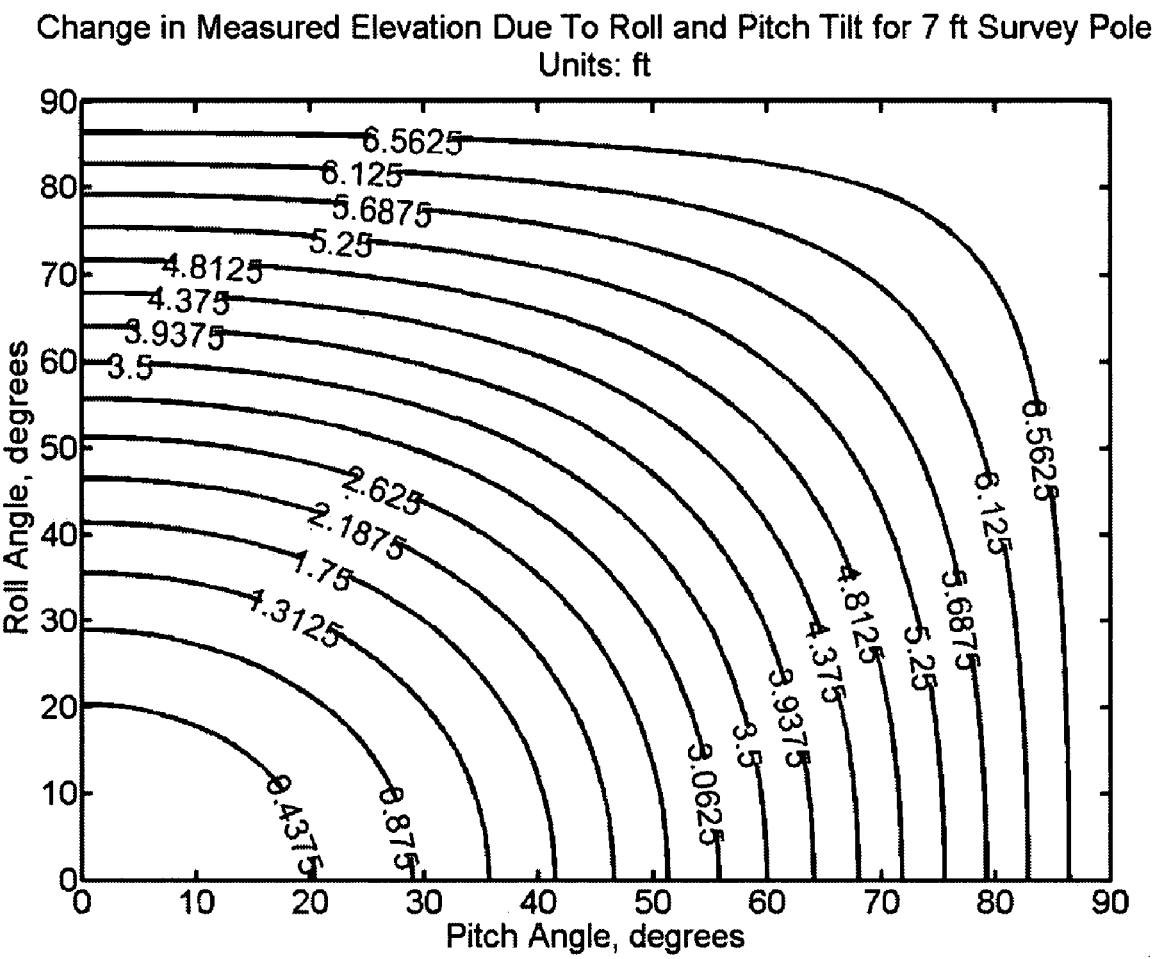
FIG. 14 illustrates the expected deviation in elevation measurements for various tilt angles for a 7 ft prism pole.
Figure 16:
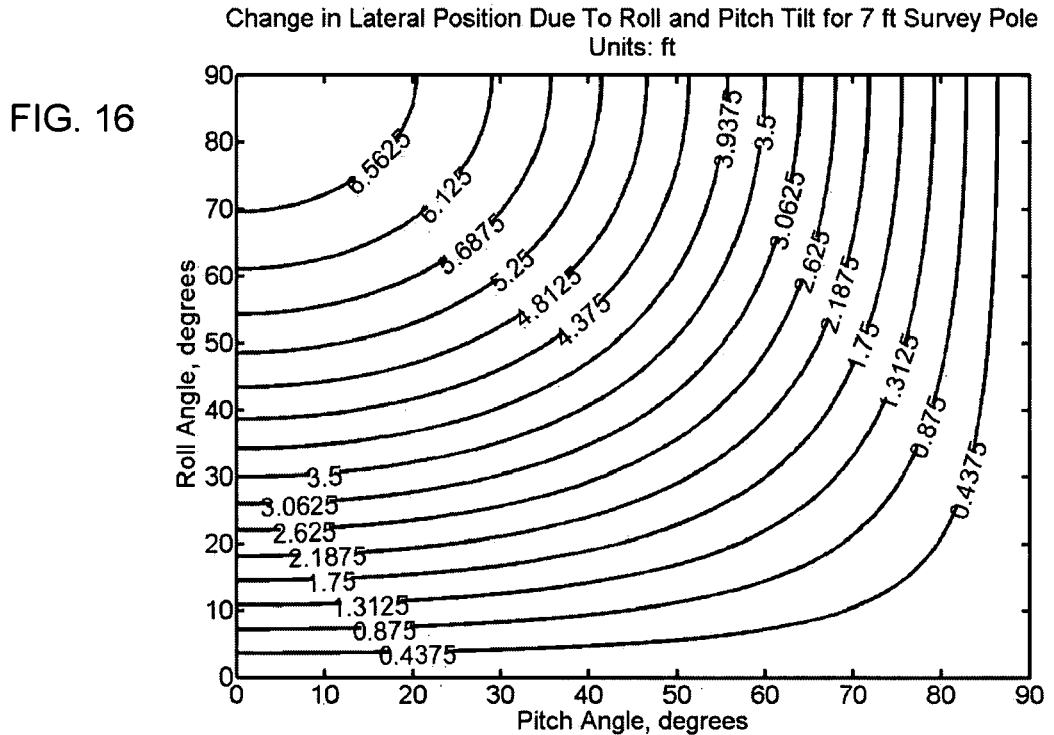
FIG. 16 illustrates the expected deviation in lateral position measurements for various roll and pitch tilt angles for a 7 ft prism pole.
Figure 17:
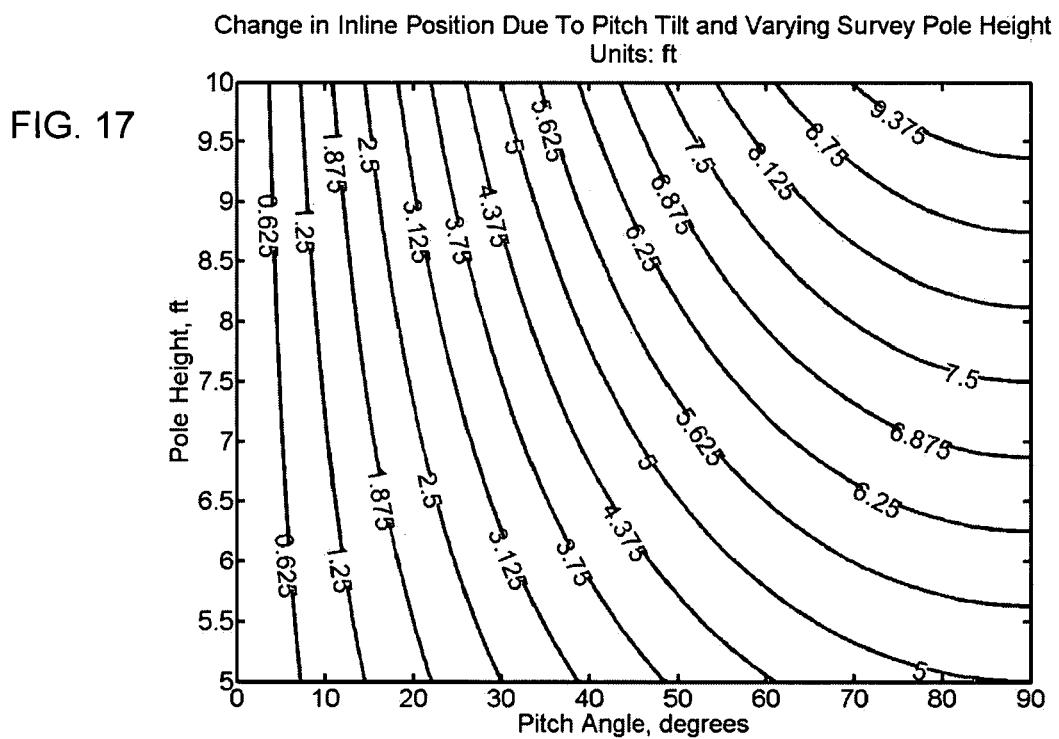
FIG. 17 illustrates the expected deviation in inline position measurements for various pitch tilt angle and varying prism pole heights.

FIG. 14 is a plot depicting the theoretical vertical deviation expected for a survey pole of height 7 ft for various degrees of tilt. A 7 ft height for a survey pole is typical for many applications. FIG. 15 is a plot depicting the theoretical inline deviation expected for a survey pole of height 7 ft for varying pitch angles. FIG. 16 is a plot depicting the lateral (horizontal) deviation expected for a survey pole of height of 7 ft for varying pitch and roll angles. FIG. 17 is a plot depicting the theoretical deviations expected for inline position measurements for various pole heights and pitch tilt. As an example, for a 7 ft pole with a pitch angle of 20 degrees and a roll angle of 20 degrees a deviation of approximately 0.82 ft in the vertical measurement and 2.39 ft in the y axis direction and 2.25 ft in the x axis direction.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method of generating measurement data and position data from a survey, comprising: obtaining measurement data representing a measured physical property of a region from a survey tool, when the survey tool is positioned at various points on a surface of the region; obtaining survey tool position data corresponding to each of the points on the surface of the region; obtaining angular offset data, representing offset of orientation of the survey tool from a normal orientation, at each of the points on the surface of the region caused by variations in inclination of the surface; and correcting the corresponding position data, based on the angular offset data, and storing corrected corresponding position data.

2. The method of claim 1, further comprising processing the measurement data based on the corrected corresponding position data.

3. The method of claim 1, wherein the region is a portion of a road or the ground, and the measurement data represents a sub-surface property of said region.

4. The method of claim 3, wherein the processing the measurement data based on the corrected corresponding position data identifies location of objects buried beneath the surface of the region.

5. The method of claim 1, wherein the angular offset data represents variations in orientation of the survey tool due to variations of the surface with respect to horizontal.

6. The method of claim 5, wherein: the obtained position data corresponding to each of the points indicates position with an offset from the surface, and the angular offset data represents an angle of an axis of the position offset with respect to a vertical orientation over the region.

7. The method of claim 6, wherein the angular offset data comprises angular measurements with respect to at least two axes of the survey tool.

8. The method of claim 1, wherein: the survey tool moves to traverse the surface of the region; and the obtaining steps are performed at least periodically as the survey tool traverses the surface of the region.

9. A method of processing position data from a survey, comprising: obtaining position data corresponding to a point on a surface of a region to be surveyed at which a survey tool is positioned; obtaining angular offset data, representing offset of orientation of the survey tool from a normal orientation, at the point on the surface of the region; and correcting the corresponding position data, based on the angular offset data, and storing corrected corresponding position data.

10. A survey system, comprising: a survey tool; a position detection device responsive to position of the survey tool, for generating survey tool position data corresponding to a point on a surface at which the survey tool is positioned; an inclinometer coupled to the survey tool, for providing angular offset data in response to orientation of the survey tool, representing offset of orientation of the survey tool at the point from a normal orientation; and a data processor for correcting the corresponding position data, based on the angular offset data.

11. The survey system as in claim 10, wherein the survey tool comprises a survey pole, to which an element of the position detection device is attached.

12. The survey system as in claim 11, wherein: the survey tool comprises at least one sensor taking measurements of a physical property of a region, at least at a plurality of different points on the surface, and providing measurement data from the measurements at the different points; the position detection device is for generating survey tool position data corresponding to each of the points on the surface of the region as the survey tool provides the measurement data; and the data processor is for correcting the survey tool position data corresponding to each of the points on the surface, based on respective angular offset data.

13. The survey system as in claim 12, further comprising means for processing the measurement data based on the corrected position data.

14. The survey system as in claim 12, wherein: the survey tool comprises a movable platform; and the at least one sensor is mounted on the moveable platform for detecting the physical property of the region as the platform moves over the surface of the region.

15. The survey system as in claim 14, wherein the at least one sensor is selected from the group consisting of: a ground penetrating radar (GPR) array; an array of electromagnetic induction antennas; an array of magnetometers; an array of vibrometers; and an array of optical sensors.

16. The survey system as in claim 14, wherein: the position detection device includes an element mounted on the platform at a location on the platform that will be offset from the surface of the region when the survey tool performs measurements, and the angular offset data represents an angle of an axis of the location offset relative to a vertical orientation over the region.

17. The survey system as in claim 16, wherein the inclinometer is selected from the group consisting of: an inertial measurement unit (IMU); a dual axis inclinometer; and two single axis inclinometers.

18. The survey system as in claim 16, wherein the position detection device comprises: a self-tracking laser theodolite ground station; and a reflector attached to the movable platform for reflecting a laser beam from the ground station back to the ground station.

19. The survey system as in claim 16, wherein the position detection device comprises a GPS receiver attached to the movable platform.

20. A data processing system, comprising at least one programmable processor and programming executable by the at least one processor, wherein execution of the programming causes the at least one processor to implement functions comprising: receiving measurement data representing a measured physical property of a region from a survey tool, when the survey tool is positioned at various points on a surface of the region; receiving survey tool position data corresponding to each of the points on the surface of the region; receiving angular offset data, representing offset of orientation of the survey tool from a normal orientation, at each of the points on the surface of the region, caused by variations in inclination of the surface; and correcting the corresponding position data, based on the angular offset data and storing corrected corresponding position data.

21. The system of claim 20, wherein the functions further comprise processing the measurement data based on the corrected corresponding position data.

22. A product comprising a machine-readable medium and programming comprising instructions executable by at least one programmable processor, wherein execution of the instructions causes the at least one processor to implement functions including: receiving measurement data representing a measured physical property of a region from a survey tool, when the survey tool is positioned at various points on a surface of the region; receiving survey tool position data corresponding to each of the points on the surface of the region; receiving angular offset data, representing offset of orientation of the survey tool from a normal orientation, at each of the points on the surface of the region, caused by variations in inclination of the surface; and correcting the corresponding position data, based on the angular offset data and storing corrected corresponding position data.

23. The product of claim 22, wherein the functions implemented upon execution of the instructions further include processing the measurement data based on the corrected corresponding position data.

* * * * *